United States Patent [19]
Typaldos et al.

[11] Patent Number: 5,862,148
[45] Date of Patent: Jan. 19, 1999

[54] MICROCONTROLLER WITH IMPROVED DEBUG CAPABILITY FOR INTERNAL MEMORY

[75] Inventors: Melanie D. Typaldos, Buda; Eric G. Chambers; Wade L. Williams, both of Austin, all of Tex.

[73] Assignee: Advanced Micro Devices, Inc.

[21] Appl. No.: 798,249

[22] Filed: Feb. 11, 1997

[51] Int. Cl.⁶ .................................................. G06F 11/00
[52] U.S. Cl. ..................................... 371/22.1; 395/183.15
[58] Field of Search ................................ 371/22.1, 22.36, 371/22.5, 27.7; 395/182.01, 183.06, 183.04, 183.05, 183.11, 185.01, 425, 550, 419, 490, 700, 800, 822, 823, 829, 834, 183.15, 183.13, 500

[56] References Cited

U.S. PATENT DOCUMENTS

| | | | |
|---|---|---|---|
| 4,349,870 | 9/1982 | Shaw et al. | 364/200 |
| 4,969,087 | 11/1990 | Tanagawa et al. | 364/200 |
| 5,371,869 | 12/1994 | Lee | 395/425 |
| 5,504,903 | 4/1996 | Chen et al. | 395/700 |
| 5,548,794 | 8/1996 | Yishay et al. | 395/871 |
| 5,612,974 | 3/1997 | Astrachan | 375/295 |
| 5,623,687 | 4/1997 | Yishay et al. | 395/800 |
| 5,652,844 | 7/1997 | Harwood, III | 395/284 |
| 5,652,903 | 7/1997 | Weng et al. | 395/800 |
| 5,657,442 | 8/1997 | Groves | 395/183.04 |
| 5,680,581 | 10/1997 | Banno et al. | 395/490 |
| 5,685,005 | 11/1997 | Garde et al. | 395/800 |
| 5,704,034 | 12/1997 | Circello | 395/183.14 |

FOREIGN PATENT DOCUMENTS

| | | |
|---|---|---|
| 0 436 211 A2 | 7/1991 | European Pat. Off. . |
| 0 453 268 A2 | 10/1991 | European Pat. Off. . |
| 0 718 763 A1 | 6/1996 | European Pat. Off. . |

OTHER PUBLICATIONS

Am 186™EM/188™ User's Manual with Am186 Family Instruction Definitions, Advanced Micro Devices, Rev. 1, 1995, Chapter 5 "Chip Select Unit," pp. 5–1 through 5–12.

*Primary Examiner*—Robert W. Beausoliel, Jr.
*Assistant Examiner*—Nadeem Iqbal
*Attorney, Agent, or Firm*—Kevin L. Daffer; Conley, Rose & Tayon; Lawrence J. Merkel

[57] ABSTRACT

A microcontroller integrates an internal memory accessible by the cores included thereon. Logic within the microcontroller compares memory addresses generated by the cores to values in a configuration register specifying a memory address range in which the internal memory resides. The logic generates a chip select signal to the internal memory if the memory address generated resides within the specified address range to enable accesses by the cores to the internal memory. The integrated circuit may be configured in a debug mode wherein the chip select signal is inhibited to the internal memory, however the chip select signal is provided external to the integrated circuit on a pin. The chip select signal may then be used to select an external memory which serves to overlay the internal memory address range. Thus the debug mode allows instruction code and data to reside in the external memory rather than the internal memory while in the debug mode. This facilitates debugging of the code since the contents of the external memory may be examined, for example by an in-circuit emulator, in a less intrusive manner than the contents of the internal memory may be examined. The debug mode may be enabled by asserting a signal upon a predefined pin at the conclusion of reset of the microcontroller. By providing the predefined pin for placing the microcontroller into the debug mode, the microcontroller may be placed into the debug mode for debug purposes without changing the instruction code being executed thereon. Furthermore, the in-circuit emulator need not have knowledge of the internal memory address range.

21 Claims, 9 Drawing Sheets

1

MICROCONTROLLER WITH IMPROVED DEBUG CAPABILITY FOR INTERNAL MEMORY

BACKGROUND OF THE INVENTION

1. Field of the Invention

This invention relates to the field of microcontrollers and, more particularly, to microcontrollers having an integrated internal memory.

2. Description of the Relevant Art

Integrated circuits have become ubiquitous in modern society. Products as diverse as automobiles, computer systems, televisions and telephones incorporate one or more integrated circuits to perform various functions. Generally speaking, an integrated circuit comprises circuitry formed upon a single monolithic semiconductor substrate. The integrated circuit implements one or more cores which perform the various functions of the integrated circuit as well as circuitry for communicating with other integrated circuits and devices external to the integrated circuit. A core is circuitry connected together to provide a desired high level function. For example, a processor core is circuitry which executes a set of instructions. Other cores may be a digital signal processing core configured to process signals, a cache controller core for managing a block of external memory as a cache, etc.

One popular type of integrated circuit is a microcontroller, which comprises a processor core as well as communications cores for various serial and parallel port connections to peripheral devices. Microcontrollers allow programmable control (via the processor core) of the peripherals connected thereto. Microcontrollers are commonly employed in a wide variety of devices including printers, cellular phones, automobiles, etc. Generally, a microcontroller is employed as the primary control chip in an electronic circuit embedded within a product other than a general purpose computer system (i.e. the so-called "embedded applications"). The microcontroller and related circuitry is employed to satisfy the computing demands of a product whose general purpose is not necessarily computing (e.g., a television, telephone, or automobile control systems).

Modern microcontrollers incorporate not only a processor core and communications cores, but also integrate other devices commonly employed therewith. Particularly, microcontrollers have begun to integrate blocks of memory. Integrating previously discrete components such as memory may lead to cost savings in the final product, since fewer components are needed. Unfortunately, integration may complicate debugging during product development. Since the integrated components within the microcontroller communicate with each other via internal buses not accessible external to the microcontroller, the observability of a user to the activity between the integrated components is reduced as compared to a discrete component implemented with readily available pins (i.e., test points).

Particularly, while developing the instruction code to be executed by the microcontroller, debugging becomes more complicated when the memory is internal to the microcontroller. External monitoring of the microcontroller no longer reveals all information regarding the memory accesses occurring to the internal memory, nor the data being transferred in response to the memory accesses. If the instruction code is not performing as the user expects, the user can oftentimes not determine the cause. Many microcontroller architectures (such as the 80C186 architecture) allow for operands to be directly accessed from memory locations. Therefore, if a memory operand is erroneous and the memory is internal to the microcontroller, a user may have to expend onerous efforts to detect the problem. For example, the instruction code may need to be modified to insert instructions for checking the values stored in a given location. Changing the code may change the dynamics of the program execution, potentially hiding the problem further by changing the circumstances in which the problem occurs. It is therefore desirable to have improved ability to debug the instruction code of an embedded application employing a microcontroller with integrated internal memory.

SUMMARY OF THE INVENTION

The problems outlined above are in large part solved by a microcontroller as disclosed herein. The microcontroller integrates a memory internal to the microcontroller which is accessible by the cores, such as a processor core, included on the same substrate as the memory. The microcontroller includes logic to generate a chip select signal to the internal memory for enabling accesses to the internal memory by the cores. The microcontroller may be configured in a debug mode to disable accesses destined for the internal memory, yet still provide the internal memory chip select signal externally on a pin in order to select a memory external to the microcontroller instead of the internal memory. Thus, the internal memory is overlaid, or mimicked, by the external memory. Other signals required to access the external memory, such as address, data and control signals, are also provided externally along with the internal chip select signal.

Accesses by the microcontroller cores to the external memory may be more easily debugged than accesses to the internal memory, since conventional debugging tools such as logic analyzers may then be employed to observe the access signals on exposed pins of the external memory. This facilitates code debugging. In particular, the external memory may reside in an in-circuit-emulator, which allows a user to set breakpoints in the instruction code and examine the contents of the external memory to debug the instruction code. The availability of the internal chip select external to the microcontroller allows the in-circuit-emulator to overlay the internal memory without requiring the in-circuit-emulator to have any knowledge of the address range of the internal memory, which in one embodiment is programmable.

In one embodiment, the debug mode of the microcontroller is entered by asserting a signal on a pin while the microcontroller is coming out of reset. This method advantageously enables the debugger to overly the internal memory without any modification to the instruction code being debugged. That is, the instruction code does not need to be altered to program the microcontroller into the debug mode. This minimizes the introduction of new failures associated with altered code and reduces the possibility of making what once was a failure disappear as a result of the altered code.

In one embodiment, the internal chip select signal is multiplexed with a control signal upon an external bus. In this manner, additional pins are not added to the microcontroller to support providing the internal chip select signal. Advantageously, costs for manufacturing the microcontroller may remain fixed even though the capabilities of the microcontroller are increased.

Broadly speaking, the present invention contemplates an integrated circuit comprising a core which generates a memory address within a memory address space. An internal memory is coupled to the core such that the memory resides within an address range of the address space of the core. The integrated circuit further includes logic coupled to the core and the internal memory. The logic generates a chip select signal to the internal memory in response to the core generating the memory address. The logic asserts the chip select signal if the memory address is within the address range. The integrated circuit may be configured in a mode to inhibit the chip select signal to the internal memory and instead provide the chip select signal external to the integrated circuit.

The present invention further contemplates a system, comprising an external memory and an integrated circuit. The integrated circuit comprises a core and an internal memory coupled to the core for storing data for use by the core. The core generates a memory address within a memory address space. The internal memory resides within an address range of the address space of the core. The integrated circuit further includes logic coupled to the core and the internal memory which generates a chip select signal to the internal memory in response to the core generating the memory address. The logic asserts the chip select signal if the memory address is within the address range. The integrated circuit may be configured in a mode to inhibit the chip select signal to the internal memory and provide the chip select signal to the external memory.

The present invention further contemplates a method for operating an integrated circuit, comprising a core for generating a memory address within a memory address space and determining if the memory address is within an address range of the address space in which an internal memory resides. If the memory address is within the address range, then a chip select signal is asserted. The method further comprises determining if the integrated circuit is configured in a mode for inhibiting the chip select signal to the internal memory. If so, the chip select signal is provided external to the integrated circuit.

BRIEF DESCRIPTION OF THE DRAWINGS

Other objects and advantages of the invention will become apparent upon reading the following detailed description and upon reference to the accompanying drawings in which.

Figure 1:
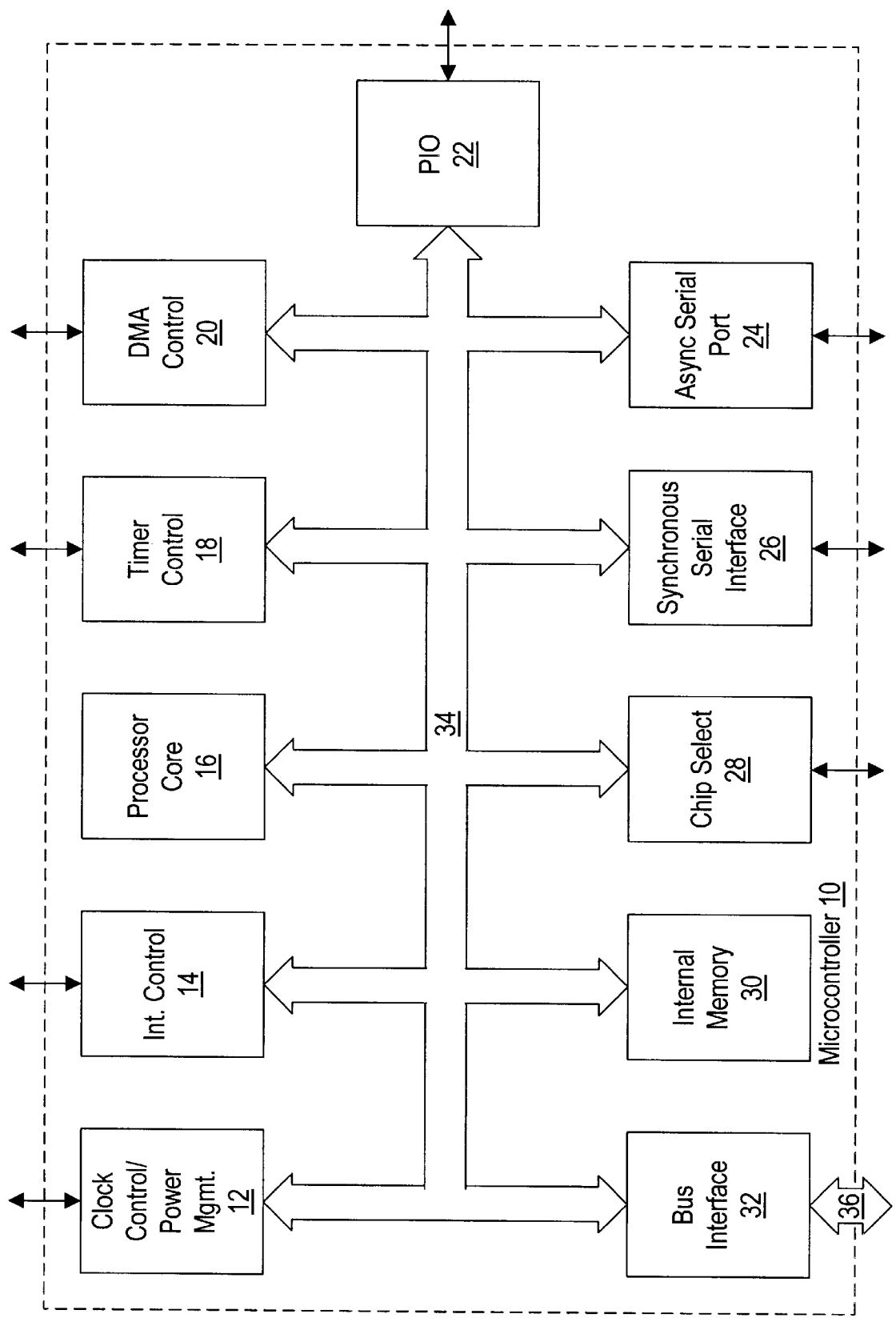
FIG. 1 is a block diagram of one embodiment of a microcontroller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to FIG. 1, a block diagram of one embodiment of a microcontroller 10 is shown. In the embodiment shown, microcontroller 10 is formed upon a single monolithic semiconductor substrate. Other embodiments are contemplated. In one embodiment, microcontroller 10 includes a clock/power management unit 12, an interrupt control unit 14, a processor core 16, a timer control unit 18, a DMA control unit 20, a programmable I/O unit 22, an asynchronous serial interface 24, a synchronous serial interface 26, a chip select unit 28, an internal memory 30, and a bus interface unit 32. An internal bus 34 interconnects and allows communication among the various elements 12–32 of microcontroller 10. In one embodiment, microcontroller 10 is an 80C186-compatible microcontroller.

Processor core 16 includes circuitry for executing a set of instructions defined by the microprocessor architecture employed by processor core 16. In one embodiment, processor core 16 is an 80C186 compatible processor core. The processor core 16 has a predetermined address space, i.e., the set of addresses which may be generated by the processor core 16. In one embodiment, the processor core 16 includes 20 address bits and the address space of the processor core 16 is 0x00000 to 0xFFFFF. The internal memory 30 resides within an address range of the address space of the processor core 16, i.e., a set of consecutive addresses. In one embodiment, the internal memory 30 address range is programmable.

Processor core 16 fetches instructions, i.e. instruction code, and certain instruction operands from the internal memory 30. Accesses by the processor core 16 to the internal memory 30 complete via internal bus 34. It is noted that the term access refers to either a read (a transfer of data from the accessed storage location to the transfer initiator, e.g. processor core 16) or a write (a transfer of data from the transfer initiator to the accessed storage location). Write accesses may also be referred to as updates.

Processor core 16 may also fetch instructions and instruction operands from memories external to the microcontroller 10. Accesses by the processor core 16 to external memory complete via external bus 36.

Figure 2:
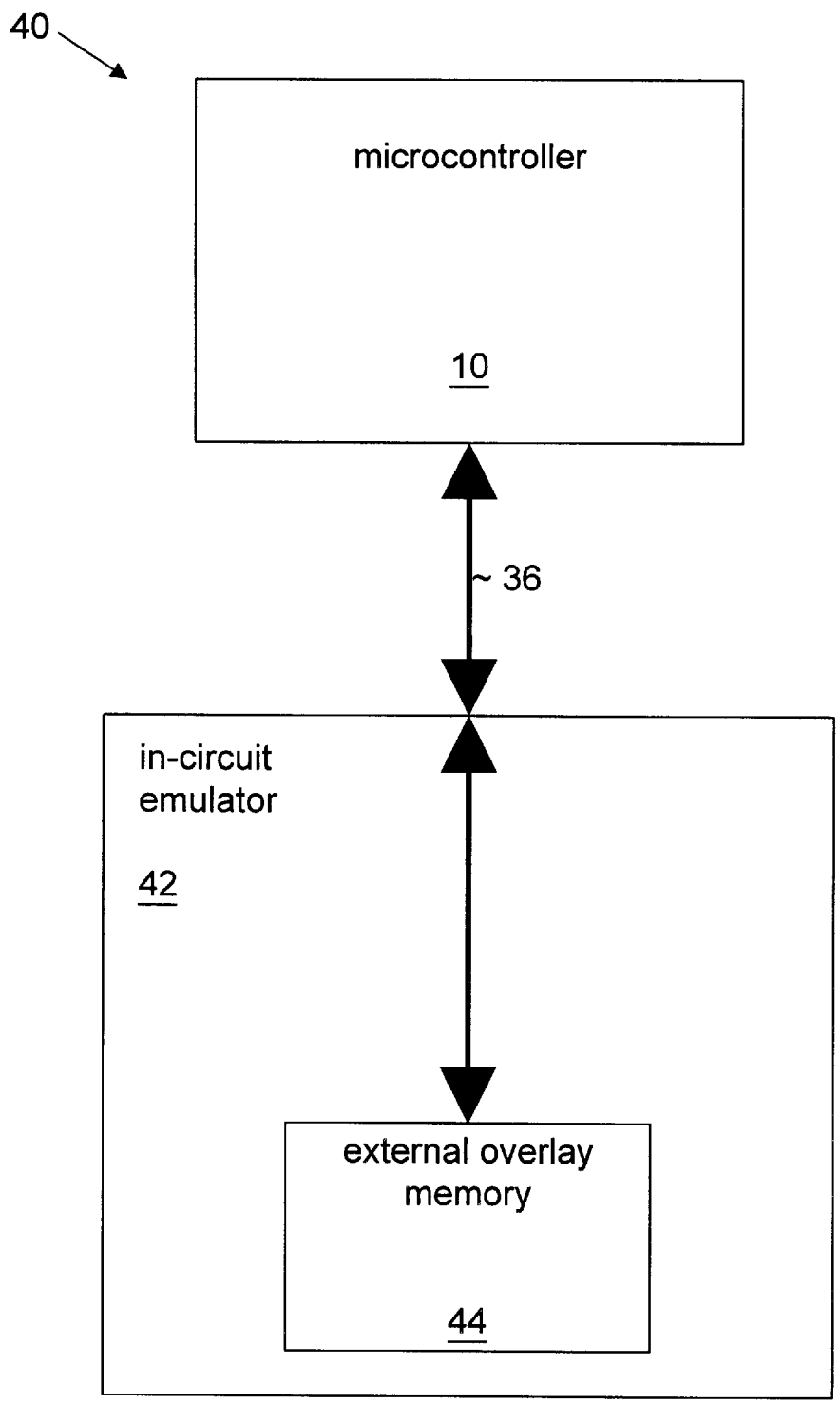
FIG. 2 is a block diagram of a system including the microcontroller shown in FIG. 1.

Referring ahead briefly to FIG. 2, a block diagram of a system 40 including microcontroller 10 is shown. System 40 further includes an in-circuit emulator (ICE) 42 which employs an external overlay memory 44. Microcontroller 10, ICE 42, and external memory 44 are interconnected via external bus 36.

A common technique employed by users to debug a system such as system 40 is to employ an ICE such as ICE 42 to set breakpoints at desired locations of the instruction code to be executed by a target processor, such as processor core 16, which cause execution of the code to halt. Once the ICE 42 has halted execution of the code, typically a second processor on the ICE 42 examines and/or modifies the contents of memory in response to user input in order to determine bugs in the code. This technique is advantageous in that it does not require the execution of additional instructions on the target processor. However, when the target processor has instructions or data residing in an internal memory, such as internal memory 30, the second processor is unable to access the memory internal to the target processor without executing further instructions on the target processor which export the contents of the internal memory to an external memory so that the contents may be examined from the external memory.

The microcontroller 10 of the present invention advantageously provides a mechanism for disabling its internal memory 30 and overlaying the internal memory 30 with an external memory, such as external memory 44, which may be examined for debug purposes, such as by an ICE 42. In-circuit emulation techniques are well known and any suitable ICE modified to employ the debug mechanism of the microcontroller 10, as will be described below, may be employed. In one embodiment, the external memory 44 is not included in an ICE, but rather is examined by other debug instruments, such as a logic analyzer, which monitors accesses to the external memory 44 by the microcontroller 10 and stores information about the accesses.

Advantageously, the internal memory 30 may be overlaid by an external memory, according to the debug mechanism of the present invention, without requiring modification to the code being debugged. Furthermore, the ICE 42 need not know the address range in which the internal memory resides. These advantages are particularly useful, among other things, in helping find code bugs associated with incorrect programming of the register within the microcontroller 10 which defines the address range of the internal memory 30. The debug mechanism of microcontroller 10 will be described in more detail below, in particular with reference to FIG. 3 and subsequent figures.

Referring again to FIG. 1, generally speaking, internal memory 30 may comprise any type of memory storage. A memory storage comprises a plurality of storage locations. Each storage location is selectable by a unique address for read and write accesses. However, in one embodiment internal memory 30 comprises 32 kilobytes of random access memory (RAM). The RAM may comprise static RAM (SRAM) cells, dynamic RAM (DRAM) cells, EEPROM cells, or flash memory cells, for example. However, any desired RAM configuration may be employed.

It is noted that internal memory 30 is not a cache memory. Cache memories are well known in the art of computer system design. Internal memory 30 and cache memories share some common characteristics, namely they may be RAM memories and may reside internal to an integrated circuit having a processor core. However, characteristics which distinguish the internal memory 30 from a cache memory are as follows.

Cache memories have a main memory "behind" the cache memory in the memory hierarchy. When data is read from or written to main memory a copy is also saved in the cache, along with the associated main memory address. The cache monitors addresses of subsequent reads to see if the required data is already in the cache. If the data is in the cache then the data is returned immediately and the main memory read is aborted (or not started). If the data is not in the cache (i.e., a cache miss occurs) then it is fetched from main memory and also saved in the cache. The internal memory 30 does not operate in this manner. In particular, the internal memory 30 does not store memory addresses associated with the data stored in the internal memory 30, but rather each storage location within the internal memory 30 always corresponds to a predetermined address, unlike the cache, in which the storage locations have different addresses associated with them during different periods of time. The different addresses are a function of the replacement algorithm employed by the cache. In addition, caches are typically designated as either an instruction cache or a data cache. However, the internal memory 30 makes no distinctions regarding the characteristics of the contents of its storage locations.

Bus interface unit 32 generally provides the circuitry for communicating upon external bus 36 in accordance with the protocol of the 80C186 interface. The 80C186 interface specifies a multiplexed address/data bus and related control signals. The control signals include a command which identifies the type of transfer (e.g. instruction code fetch versus data access). Additionally, the control signals include read/write controls indicating the read/write nature of the access. For write accesses, an indication of which of the two bytes is being written (or both) is included in the control signals. Additionally, the control signals include an S6 control signal indicating whether or not an access is part of a direct memory access (DMA). Other control signals within the 80C186 interface may be included as well, as is well known in the art.

Clock control/power management unit 12 receives an input oscillating signal from an external oscillator (not shown), and generates internal and external clocking signals from the input oscillating signal. The internal and external clocking signals may operate at full speed, or may operate in a power saving mode at a lower frequency than the full speed frequency. Various algorithms for selecting the power saving mode are well known.

Interrupt control unit 14 receives interrupt signals from devices connected to microcontroller 10 ("peripheral devices"). Generally, a device interrupts microcontroller 10 when a specific service is needed by the device. For example, if a device is buffering input data and the buffer is full, the device may interrupt microcontroller 10. Microcontroller 10, in response to instructions in an interrupt service routine corresponding to the interrupt received by interrupt control unit 14, transfers data out of the buffer. In one embodiment, interrupt control unit 14 receives up to six interrupt request lines from external devices and six internal interrupt request lines (three from timer control unit 18, two from DMA control unit 20, and one from asynchronous serial port 24). Interrupt control unit 14 prioritizes the interrupts and presents the interrupts to processor core 16 one at a time. Additionally, individual interrupt requests may be programmably masked according to a user's needs.

Timer control unit 18 includes a plurality of programmable timers. The timers may be used to time certain events. Additionally, one of the timers may be used as a "watchdog timer". A "watchdog timer" is initialized by a software instruction just prior to performing an instruction or instructions which may result in an infinite hang condition (e.g. infinite loop, an instruction which never completes executing because data is never returned from an external device, etc.). The watchdog timer provides an interrupt after counting down, causing the processor core 16 to exit from the instruction code which is experiencing the infinite hang condition. The microcontroller may then proceed with other tasks.

DMA control unit 20 is configured to perform direct memory access (DMA) transfers between memory and I/O spaces or from two address ranges within one or the other of the memory and I/O spaces. Generally, DMA control unit 20 is programmed with source and destination addresses and a transfer count defining the number of bytes to be transferred. DMA control unit 20 then performs the indicated transfer. In one embodiment, DMA control unit 20 includes two DMA channels for programming two different DMA transfers.

PIO unit 22 allows programming of a set of programmable input/output (PIO) pins. A user may choose to program each individual pin as in input or output signal. The signal may be employed for any purpose according to a user's needs. Values conveyed on an output pin or received from an input pin are stored in respective locations of a register which is accessible to the user via an instruction.

Asynchronous serial port 24 provides an asynchronous serial communication mechanism compatible with industry standard RS232 specifications. On the other hand, synchronous serial interface 26 provides a synchronous communications mechanism via a synchronous serial interface including a clock pin, a data pin, and a pair of enable pins. The data pin and pair of enable pins are referenced to the clock pin.

Chip select unit 28 provides a set of external chip select signals for a variety of peripheral devices based upon a programmable memory map. Each external chip select signal is assigned a contiguous range of addresses within the address space of microcontroller 10. The peripheral devices may be memories external to the microcontroller 10, or other devices. Each external chip select signal is received by a particular peripheral device, and an assertion of that external chip select signal informs the particular peripheral device that the address being presented is within that peripheral device's address range. In one embodiment, 20 bits of address are employed, providing a 1 megabyte address space. Each external chip select is programmed to respond to a specific range of addresses within the 1 megabyte address space. In one embodiment, up to 12 external chip selects are included in accordance with 80C186 compatibility.

Figure 3:
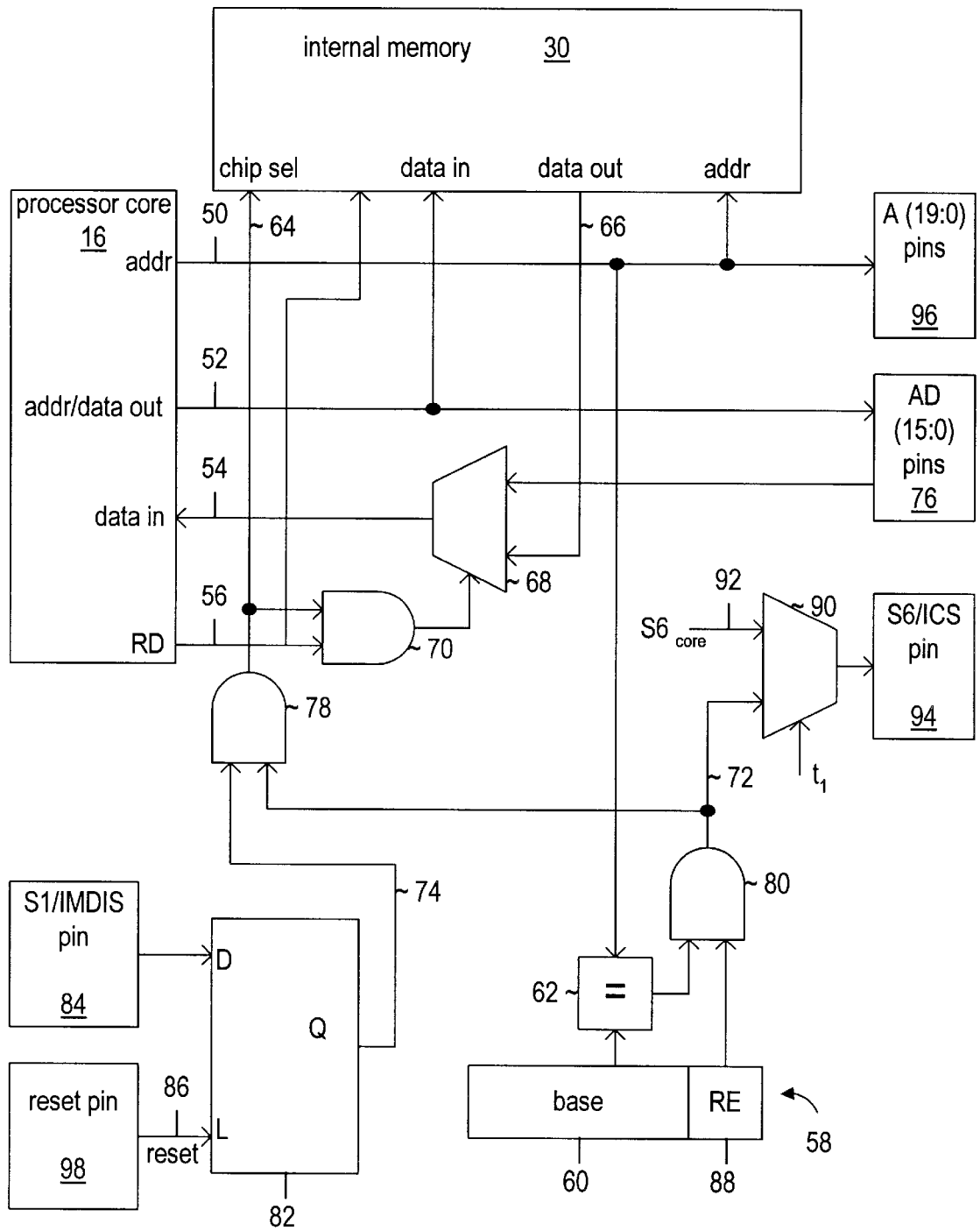
FIG. 3 is a block diagram of portions of the microcontroller shown in FIG. 1.

Referring now to FIG. 3, a block diagram showing one embodiment of a portion of microcontroller 10 in greater detail is presented for one specific implementation of microcontroller 10. Other embodiments are contemplated. FIG. 3 includes processor core 16, internal memory 30, and other logic pertinent to the debug mechanism described. In one embodiment, portions of the logic are comprised in chip select unit 28 and portions of the logic are comprised in bus interface unit 32.

Processor core 16 provides addresses of memory accesses upon an address bus 50 as well as a processor multiplexed address/data bus 52. For write accesses, processor core 16 provides the write data upon processor multiplexed address/data bus 52. For read accesses, processor core 16 receives the read data upon a processor data input bus 54. Additionally, an indication that an access is a read is asserted upon a read line 56. Write accesses are accompanied by a deasserted indication upon read line 56. It is noted that address bus 50 is conveyed upon a set of external address pins 96 for connection to an external memory. Address pins 96 comprise a portion of external bus 36 of FIG. 1. Address bus 50 is an extension to the 80C186 interface added by microcontroller 10. Address bus 50 is driven with the address of an access throughout the entire bus transfer of that access.

Internal memory 30 receives address bus 50 from processor core 16, and uses address bus 50 to select a storage location within internal memory 30 if the address lies within the address range assigned to internal memory 30. A configuration register 58 stores a base address 60 of the memory range assigned to internal memory 30. A comparator circuit 62 compares the base address to the address conveyed upon address bus 50 (which is coupled to comparator circuit 62). In one embodiment, internal memory 30 includes 32 kilobytes of storage. For such an embodiment, the least significant 15 bits of the address provide an offset within the 32 kilobyte memory range and the remaining bits provide the identification of the 32 kilobyte memory range within the 1 megabyte address space defined by address bus 50. In the exemplary embodiment shown, address bus 50 includes 20 bits. Therefore, the five most significant bits of the address are compared to the base address 60. Therefore, base address 60 may store only the five most significant bits and comparator circuit 62 may be a five bit comparator.

The output of comparator circuit 62 is routed to an input of an AND gate 80 which generates internal chip select signal 72. Internal memory chip select signal 72, after being qualified by a memory disable signal 74, is provided as qualified internal memory chip select signal 64 to internal memory 30 to inform the internal memory 30 that the address being generated by the processor core 16 is within address range of the internal memory 30. Internal memory 30 further receives read line 56 in order to distinguish read accesses from write accesses.

If a read access to internal memory 30 is detected (via an asserted qualified internal chip select signal 64 and an asserted read signal upon read line 56), then internal memory 30 provides the data from the addressed storage location upon an internal memory data bus 66. Internal memory data bus 66 is coupled to a multiplexor 68 which drives processor data input bus 54. Additionally, an AND gate 70 provides the selection signal for multiplexor 68. AND gate 70 receives read line 56 and qualified internal chip select line 64 as inputs. Therefore, a logical one is produced by AND gate 70 when a read access to internal memory 30 is performed, as long as the read access is not inhibited by RE bit 88 or the memory disable signal 74. Upon receipt of the logical one upon its select input, multiplexor 68 selects the value upon internal memory data bus 66 for conveyance upon processor data input bus 54. Read data from internal memory 30 is thereby conveyed to processor core 16 for internal memory read accesses. During other cycles, the value conveyed upon external pins 76 is conveyed upon processor data input bus 54.

If a write access to internal memory 30 is performed, then the read signal upon read line 56 is deasserted while the qualified internal chip select signal 64 is asserted. Processor core 16 conveys the write data upon processor multiplexed address/data bus 52 during the appropriate cycle according to the 80C186 interface definition. Internal memory 30 receives the write data from processor multiplexed address/data bus 52 and stores the data into the storage location selected by the address upon address bus 50.

Read and write accesses to external memory or peripheral devices occur via external pins 96, 76, 94, and 84, as well as other external pins forming external bus 36 (not shown). Multiplexor 68 selects pins 76 for processor data input bus 54 for external read and write accesses.

Processor multiplexed address/data bus 52 is conveyed upon external pins 76 of microcontroller 10 as part of external bus 36. In particular, external pins 76 form the multiplexed address/data bus defined by the 80C186 interface. It is noted that the multiplexed address/data bus portion of external bus 36 is an input/output bus. Driver circuitry at external pins 76 is disabled if external address/data bus 74 is being driven externally (e.g. during the data portion of an external read access). It is further noted that pins 96, 76, 94, and 84 are metallic conductors upon the exterior of a package enclosing the semiconductor substrate upon which microcontroller 10 is fabricated. The package protects microcontroller 10 from the external environment, and the metallic conductors provide electrical connection to microcontroller 10 for peripheral devices. Many methods for connecting the metallic pins to the circuitry shown in FIG. 3 are well known and may be applied in the manufacture of microcontroller 10.

The internal memory 30 may be disabled in microcontroller 10 via a software-programmable bit in a configuration register. An RE (RAM enable) bit 88 from configuration register 58 is coupled to the input of AND gate 80. If the RE bit 88 has a value of zero, the RE bit serves to inhibit the indication by the comparator 62 that an access to the address range of the internal memory 30 was performed by the processor core 16, thereby causing internal chip select signal 72 to be deasserted. In this manner, a software instruction may disable accesses to the internal memory 30 by writing a zero value to the RE bit.

The internal memory 30 may also be disabled in microcontroller 10 via the value on a predefined pin at the deassertion of the reset signal. An AND gate 78 provides this functionality along with a latch 82 and external S1/IMDIS (Internal Memory DISable) pin 84 in the present embodiment. In other words, external S1/IMDIS pin 84 is the predefined pin in the present embodiment (S1/IMDIS is a control signal in the 80C186 interface) used to place the microcontroller 10 into the debug mode described above. A reset signal 86 is shown as the clock input for latch 82. Reset signal 86 is received via a reset pin 98 to microcontroller 10. Latch 82 is configured to store the value conveyed upon S1/IMDIS pin 84 upon deassertion of the reset signal 86. In the embodiment shown, a logical zero value received from S1/IMDIS pin 84 into latch 82 indicates that debug mode is desired. Therefore, the output of latch 82 is connected to an input of AND gate 78 and serves to inhibit internal chip select signal 72 if the desire for debug mode is indicated by the value sampled on the S1/IMDIS pin 84. It is noted that capturing the value of a pin at the transition of a particular signal is referred to as sampling the pin. The particular signal may be the reset signal, as in the above example, or may be a clock signal or other signal.

In the present embodiment, the multiplexed pin shared by the internal chip select signal 72 and a control signal is the S6/ICS pin. Multiplexor 90 is provided to select between internal chip select line 64 and a $S6_{core}$ line 92. $S6_{core}$ line 92 provides the S6 control signal defined by the 80C186 interface. The S6 control signal is normally driven upon S6/ICS pin 94 during an entire bus transfer under the 80C186 interface, but S6/ICS pin 94 is multiplexed between internal chip select line 72 and the S6 control signal in the present embodiment. More particularly, the internal chip select signal 72 is presented upon S6/ICS pin 94 during a first bus cycle of a bus transfer for an access to internal memory 30, and the S6 control signal from $S6_{core}$ line 92 is provided during the remaining bus cycles of the bus transfer. Therefore the select signal for multiplexor 90 selects the internal chip select signal during the first bus cycle of the transfer (the "$t_1$" cycle, as described further below). An indication that a given cycle is a "$t_1$" cycle is therefore used as the select line for multiplexor 90. It is noted that the select line for multiplexor 90 and the $S6_{core}$ line 92 are provided by bus interface unit 32 in response to the current bus cycle and the initiator of the bus transfer, respectively.

As used herein, the term "multiplex" refers to the process of conveying multiple signals upon a particular pin during dissimilar time intervals. For example, the internal chip select signal 72 is conveyed on the S6/ICS pin 94 during a first bus cycle of a transfer while the control signal is conveyed during subsequent bus cycles. Advantageously, component costs remain fixed (since new pins are not added) even with the addition of the internal chip select signal 72 to external bus 36. In one embodiment, external bus 36 is compatible with the 80C186 interface with the addition of a separate, 20 bit address bus for interfacing with external memory. The S6 pin may be used as the multiplexed pin for conveying the internal chip select in one exemplary embodiment. The S6 control signal is then conveyed during the subsequent bus cycles of the transfer.

As used herein, the term "multiplexed address/data bus" refers to a bus which is shared by both the address and data portions of a bus transfer. The address identifies the target (write) or source (read) location of a transfer, and the data is the corresponding data for the transfer. The address is conveyed upon the multiplexed address/data bus, and then the bus is used during a subsequent bus clock cycle or cycles to convey the data. It is noted that buses 50, 52, 54, and 66 and read line 56 comprise a portion of internal bussing 34. It is further noted that during accesses to internal memory 30, address bus 50, data bus 52 (in the case of a write access), and pertinent control signals (such as command, read/write, address latch enable, data enable, and byte enable signals) associated with the access are broadcast by bus interface unit 32 upon an external bus 36 irrespective of the microcontroller 10 being in debug mode. That is, in addition to the internal chip select signal 72 being available via the S6/ICS pin 94, the address, data and control signals needed by the external memory which overlays the internal memory 30 in debug mode are also available to the external memory.

Thus, when the microcontroller 10 is placed into debug mode, via the S1/IMDIS pin 84 and reset pin 98, the internal memory 30 is disabled such that all accesses are performed from external memory, but internal chip select signal 72 as driven upon S6/ICS pin 94 still reflects that the access is within the range of addresses indicated by base field 60. In this manner, an ICE may emulate the internal memory for debugging while the external assertion of the internal chip select line 72 still indicates those accesses which are to internal memory 30 if internal memory 30 were enabled. It is noted that if internal memory 30 is disabled via the RE bit 88, then the external assertion of the internal chip select signal 72 is inhibited as well. If the internal memory 30 is not disabled via the RE bit 88 but the internal memory 30 is disabled via the assertion of the S1/IMDIS pin 84 at the deassertion of reset, i.e. placed into debug mode, the external assertion of internal chip select 72 signal remains enabled.

In one embodiment, an ICE places the microcontroller 10 into the debug mode. That is, the ICE asserts the signal on the S1/IMDIS pin 84 while taking the microcontroller 10 out of reset. In one embodiment, the ICE includes external memory which overlays the internal memory 30. The ICE latches the internal chip select signal 72 from the S6/ICS pin 94 during the $t_1$ cycle and uses the latched signal as the chip select to the external memory. It is noted that the debug mode of the microcontroller 10 may be employed for any purpose desired by the embedded application designer and is not restricted to being used for debug purposes.

In many embedded applications in which the microcontroller 10 is employed, the internal memory 30 is sufficiently large to provide all of the memory required of its type.

However, in other embedded applications, additional memory may be required. In such case, additional external memory may be coupled to the microcontroller 10 via the bus 36. The additional memory resides within a different address range than the internal memory 30.

Figure 4:
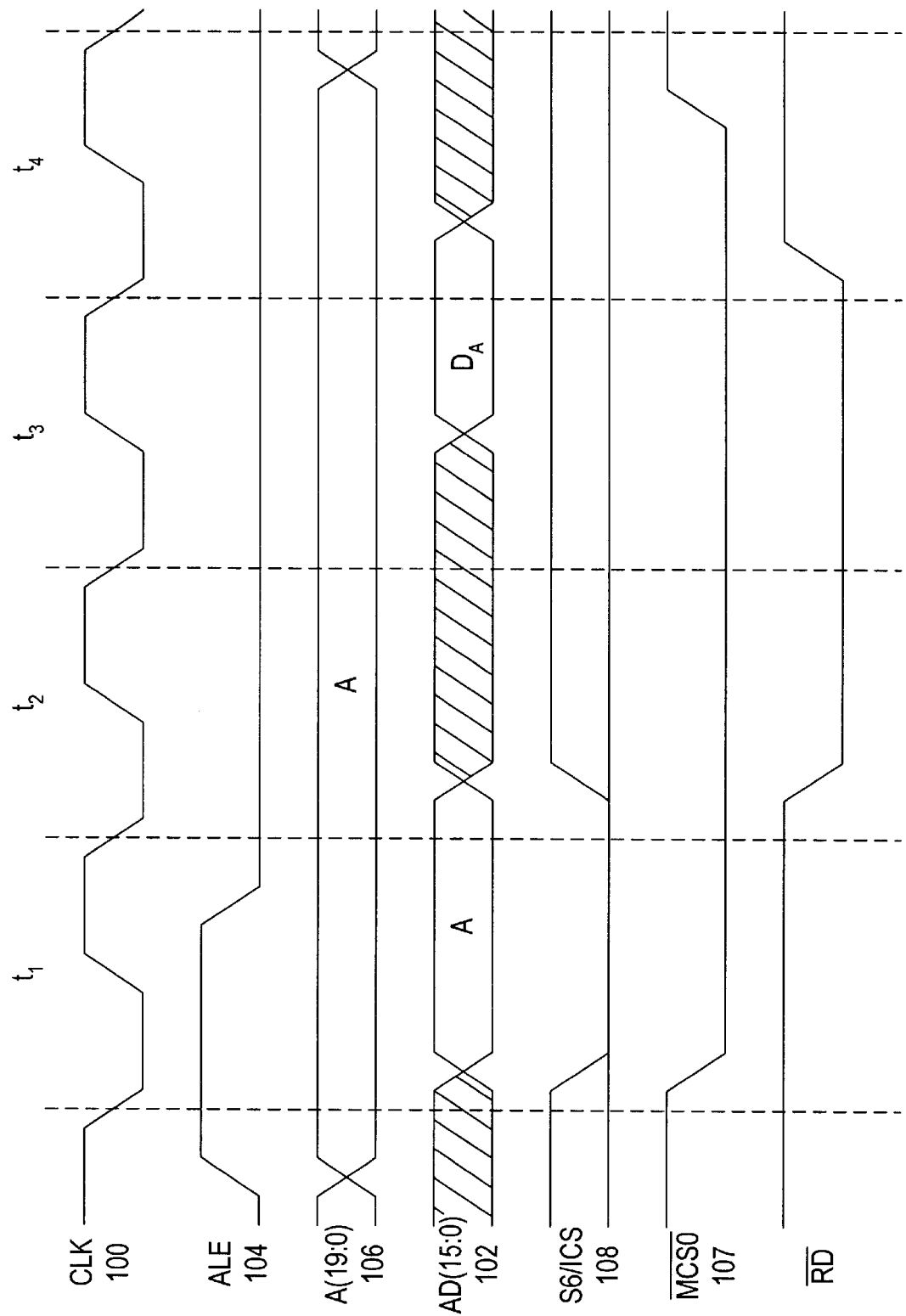
FIG. 4 is a timing diagram of an external read access for the microcontroller shown in FIG. 1, depicting the deassertion of the internal chip select signal.

Turning now to FIG. 4, a timing diagram depicting a portion of one embodiment of external bus 36 during a read access to external memory 44 is shown. Other portions of external bus 36 may operate in the normal fashion. Four bus clock cycles are depicted (labeled $t_1$ through $t_4$, separated by vertical dashed lines). The bus clock cycles are defined as one period of a clock signal 100 provided by clock control/power management unit 12. The period begins and ends at successive falling edges of clock signal 100, as indicated in FIG. 4.

The four bus clock cycles $t_1$ through $t_4$ are defined by the 80C186 interface to comprise a bus transfer. Bus clock cycle $t_1$ is the bus clock cycle in which the address is transmitted upon the multiplexed address/data bus 102. Bus clock cycle $t_2$ is used as a buffer between transmission of the address and transmission of the data. The source for the address and the source for the corresponding data may be different (e.g. a read access in which the source for the address is the master of the bus transfer and the source for the data is the slave of the bus transfer). In order to guarantee that the master and the slave of the transfer do not drive the multiplexed address/data bus 102 simultaneously, the buffer of bus clock cycle $t_2$ is inserted. Bus clock cycle $t_3$ is the bus clock cycle in which data is transferred across multiplexed address/data bus 102. Finally, bus clock cycle $t_4$ provided a buffer between the data transfer and a subsequent address transfer, which could begin as soon as the clock cycle following bus clock cycle $t_4$. It is noted that, in FIG. 4 as well as other timing diagram figures shown herein, a cross-hatched pattern shown with respect to a given bus indicates that no value is driven in that clock cycle or the value is a don't care with respect to the given bus transfer. Generally speaking, a bus transfer is the transmission of an address from a master (initiator) to a slave (responder) and the transmission of the data corresponding to that address. The transmission of the data is from the slave to the master if the bus transfer is a read; and the transmission of the data is from the master to the slave if the bus transfer is a write.

The initiation of a bus transfer is indicated by the assertion of an address latch enable (ALE) signal 104 by microcontroller 10. The address upon multiplexed address/data bus 102 becomes valid (i.e. each signal is stable at a logical one or logical zero value) prior to the falling edge of ALE signal 104. ALE signal 104 therefore identifies a bus clock cycle as bus clock cycle $t_1$ of a bus transfer. Bus clock cycles $t_2$ through $t_4$ follow on subsequent clock cycles. It is noted that wait states may be inserted between bus clock cycle $t_2$ and bus clock cycle $t_3$ according to the needs of devices external to microcontroller 10.

Address bus 106 conveys the address corresponding to the bus transfer throughout the entire transfer. For example, bus cycles $t_1$ through $t_4$ shown in FIG. 4 have the address "A" driven upon address bus 106. Address "A" is an exemplary address within the address range assigned to external memory 44 as shown in FIG. 2. Address "A" is further conveyed upon multiplexed address/data bus 102 during bus clock cycle $t_1$. Still further, the value of the internal chip select signal 72 is driven upon the S6/ICS pin 94 during bus clock cycle $t_1$ (reference number 108 in FIG. 4). Preferably, the internal chip select signal 72 is an active high signal. Since FIG. 4 depicts a read to external memory 44, the S6/ICS pin 94 conveys a low (i.e., inactive) signal.

Still further, an external chip select signal is asserted during bus clock cycle $t_1$ to select the external memory 44. The external chip select is any external chip select provided by the microcontroller 10. FIG. 4 depicts a signal conveyed on mid-range chip select 0 pin (MCS0, reference number 107 in FIG. 4) present in the 80C186 architecture as an exemplary external chip select. The microcontroller 10 is programmed to generate the external chip select in the desired address range corresponding to the external memory 44. Preferably, chip select signal 72 is asserted (active) high, and therefore is deasserted as shown in FIG. 4. Generally speaking, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. During clock cycles $t_2$–$t_4$ the S6/ICS pin 94 conveys its normal control signal in accordance with the 80C186 interface definition.

During clock cycle $t_3$, the data corresponding to address "A" ("$D_A$" in FIG. 4) is conveyed by external memory 44 to microcontroller 10 upon multiplexed address/data bus 102. It is noted that multiplexed address/data bus 102 corresponds to pins 76 in FIG. 3. Similarly, address bus 106 corresponds to pins 96 and S6/ICS signal 108 corresponds to S6/ICS pin 94.

Figure 5:
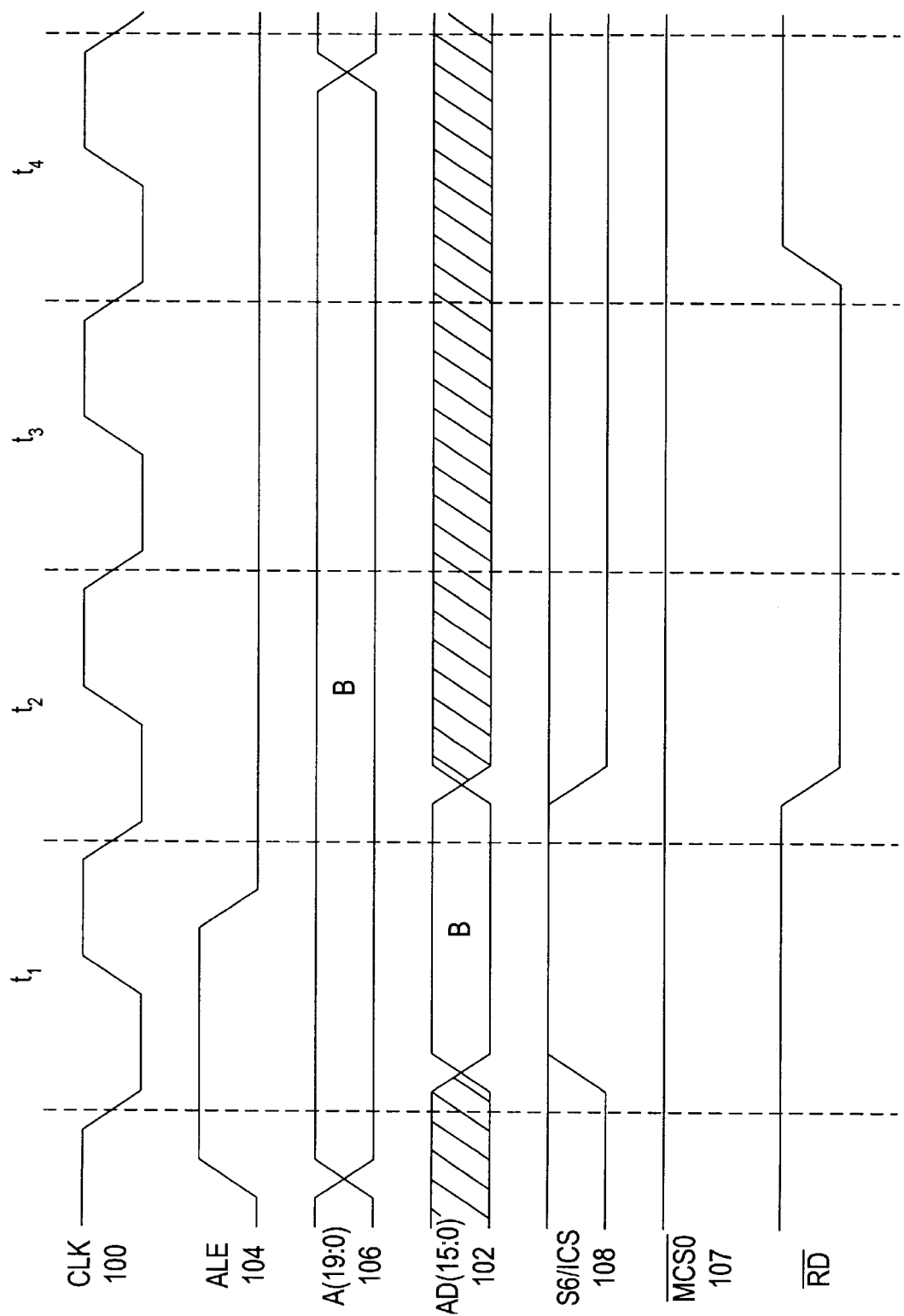
FIG. 5 is a timing diagram of an internal read access for the microcontroller shown in FIG. 1, depicting the assertion of the internal chip select signal.

Turning now to FIG. 5, a timing diagram depicting a portion of one embodiment of external bus 36 during a read access to an address "B" within internal memory 30 is shown. Other portions of external bus 36 may operate in the normal fashion. Clock signal 100, ALE signal 104, address bus 106, multiplexed address/data bus 102, and S6/ICS pin 108 are shown.

Similar to FIG. 4, address "B" is conveyed upon address bus 106 during the entire bus transfer (e.g. bus cycles $t_1$ through $t_4$). Additionally, address "B" is conveyed upon multiplexed address/data bus 102 during bus cycle $t_1$. Dissimilar from FIG. 4, however, the S6/ICS pin 94 conveys a high signal indicating that the internal chip select signal is asserted.

Comparing FIGS. 4 and 5, an external memory access may be readily discerned from an internal memory access by examining the value of the S6/ICS 94 pin during the $t_1$ bus cycle of a bus transfer. Advantageously, internal memory accesses may be detected by observing a relatively small number of pins. The small number of pins is an advantage both for a user who may be viewing the pins upon a bus analyzer attached to external bus 36 and for a user who may be employing an ICE to perform debugging. The bus analyzer generally can only display a limited number of signals, and therefore having few signal lines needed to detect an internal memory access may allow the user to view all of the relevant signals upon the screen simultaneously. For the user employing an ICE, the fewer pins received by the ICE is an advantage in the same way that any circuit benefits from a low pin count (e.g. reduced cost, reduced complexity, etc.).

Figure 6:
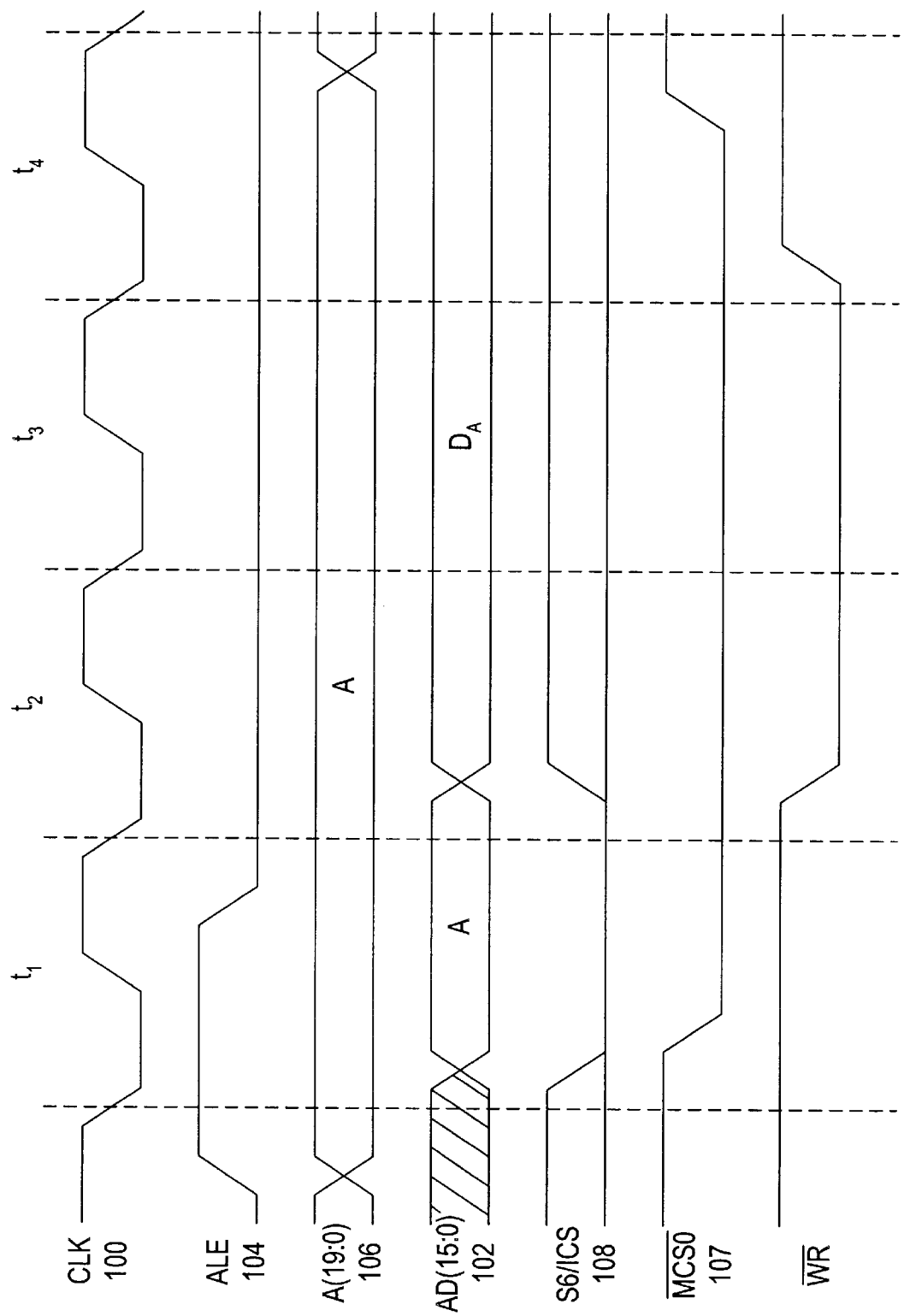
FIG. 6 is a timing diagram of an external write access for the microcontroller shown in FIG. 1, depicting the deassertion of the internal chip select signal.
Figure 7:
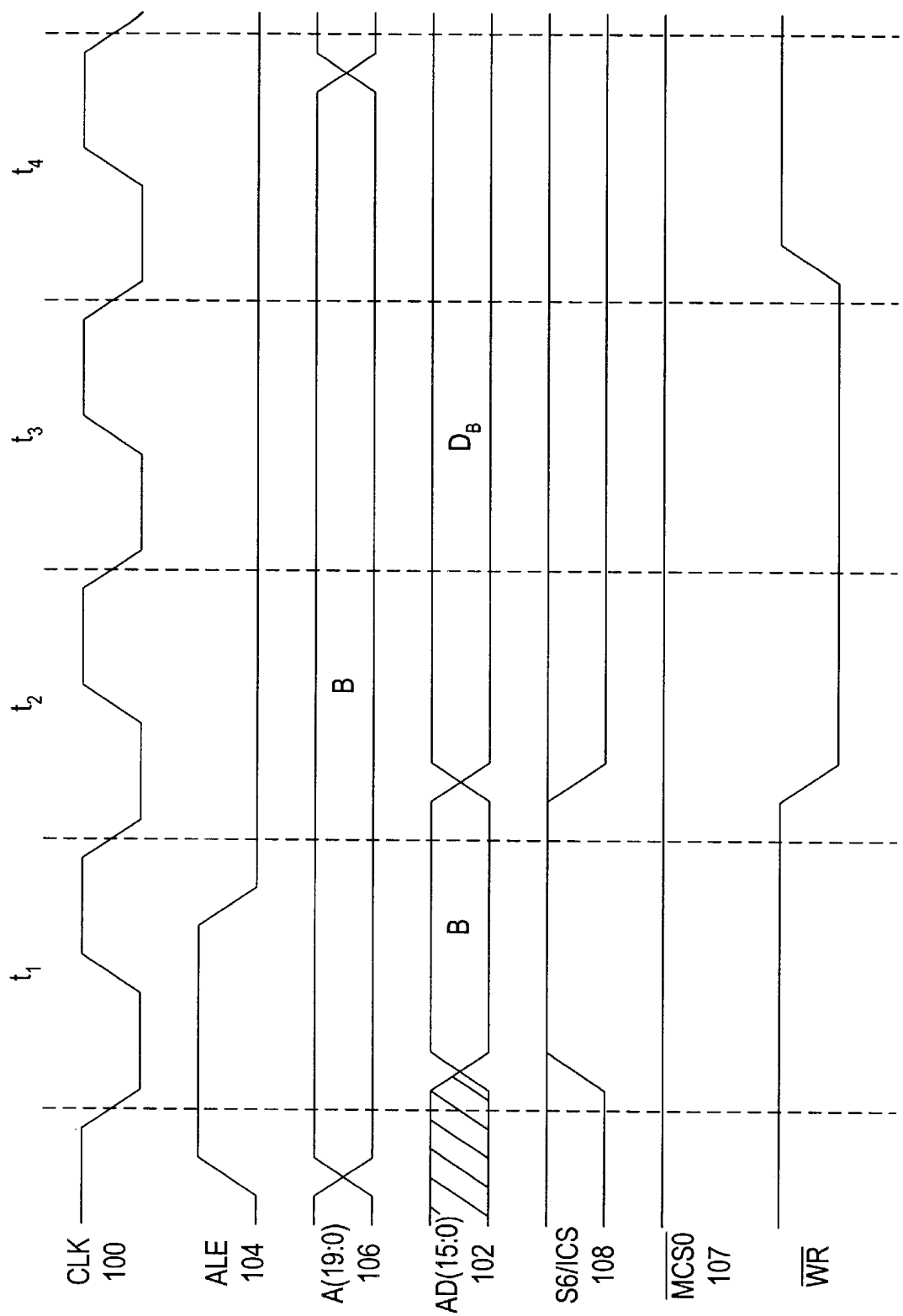
FIG. 7 is a timing diagram of an internal write access for the microcontroller shown in FIG. 1, depicting the assertion of the internal chip select signal.

The internal chip select indication is also conveyed for write accesses in a similar manner. FIG. 6 is a timing diagram depicting a portion of one embodiment of external bus 36 during a write access to an address "A" external to internal memory 30. Other portions of external bus 36 may operate in the normal fashion. Clock signal 100, ALE signal 104, address bus 106, multiplexed address/data bus 102, and S6/ICS pin 108 are shown. Since address "A" is external to internal memory 30, the internal chip select signal 108 is deasserted during bus clock cycle $t_1$. Likewise, since address "A" is directed at the address range of the external chip select, the external chip select signal 107 is asserted during bus clock cycle $t_1$. The data corresponding to address A is provided by microcontroller 10 (i.e. "$D_A$" shown in FIG. 6). FIG. 7 is a timing diagram depicting a portion of one embodiment of external bus 36 during a write access to an address "B" within internal memory 30. Other portions of external bus 36 may operate in the normal fashion. Clock signal 100, ALE signal 104, address bus 106, multiplexed address/data bus 102, external chip select 107 and S6/ICS pin 108 are shown. Since address "B" is within internal memory 30, the internal chip select signal 72 is asserted during bus clock cycle $t_1$. The data corresponding to address B is provided by microcontroller 10 (i.e. "$D_B$" shown in FIG. 7).

Figure 8:
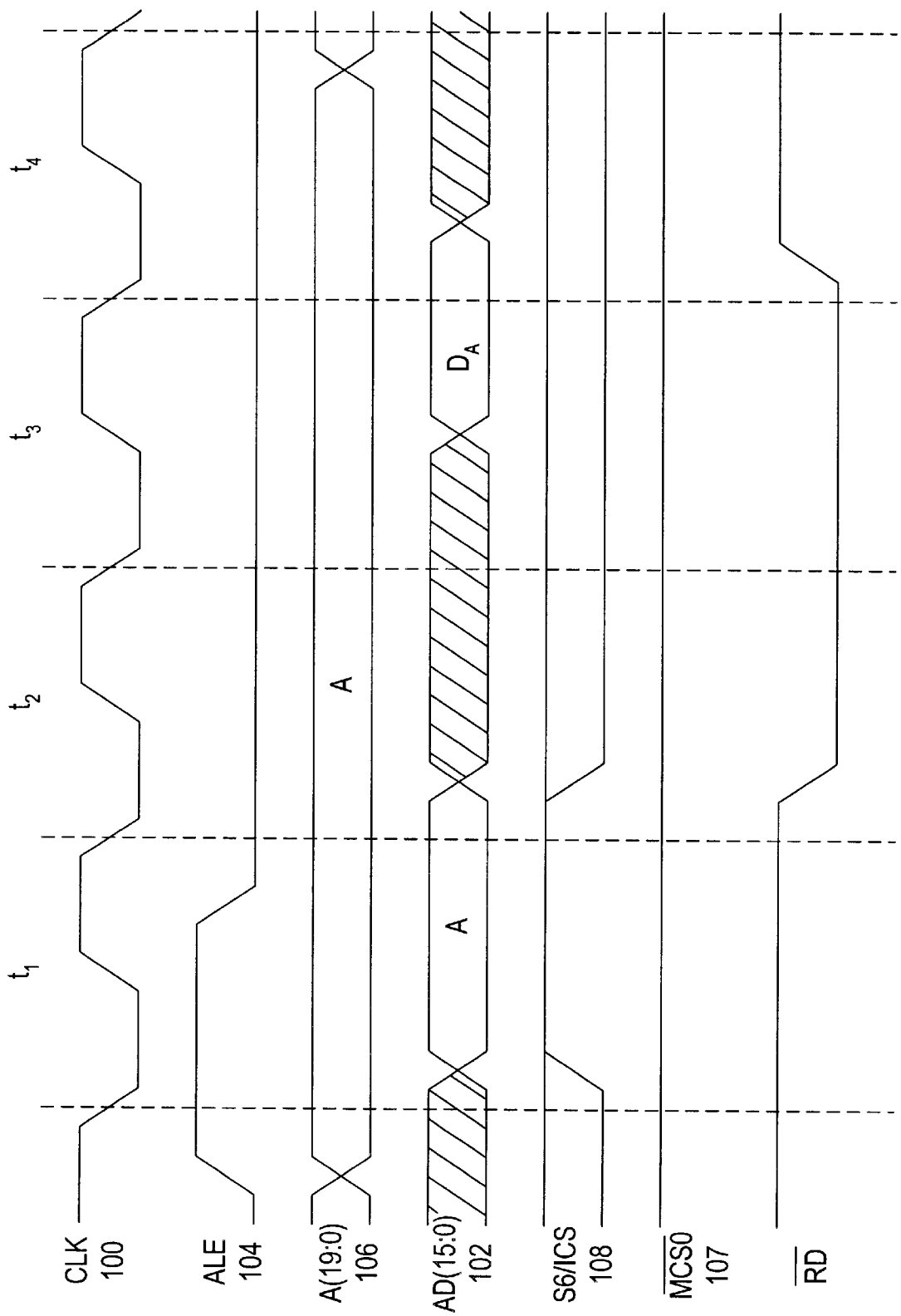
FIG. 8 is a timing diagram depicting a read access by the microcontroller shown in FIG. 1 from an overlaid external memory using the internal chip select signal.

Turning now to FIG. 8, a timing diagram depicting a read access by the microcontroller 10 shown in FIG. 1 from an overlaid external memory, such as external memory 44 of FIG. 2, using the internal chip select signal 72 provided externally on the S6/ICS pin 94 is shown. The timing diagram of FIG. 8 is similar to that of FIG. 4, and the access to the overlaid external memory is similar to the access depicted in FIG. 4, with the difference that the internal chip select signal 72 is asserted on the S6/ICS pin 94 during the $t_1$ bus cycle, as shown, and this signal is used to select the external memory 44 rather than the external chip select, i.e. MCS0 107 as in FIG. 4. In one embodiment, logic within the ICE 42 latches the signal provided on the S6/ICS pin 94 during the $t_1$ bus cycle and provides the latched signal to the external memory 44 to select the external memory as the target of the read access. The external memory 44 then provides the data "$D_A$" corresponding to address A during the $t_3$ bus cycle as shown.

Figure 9:
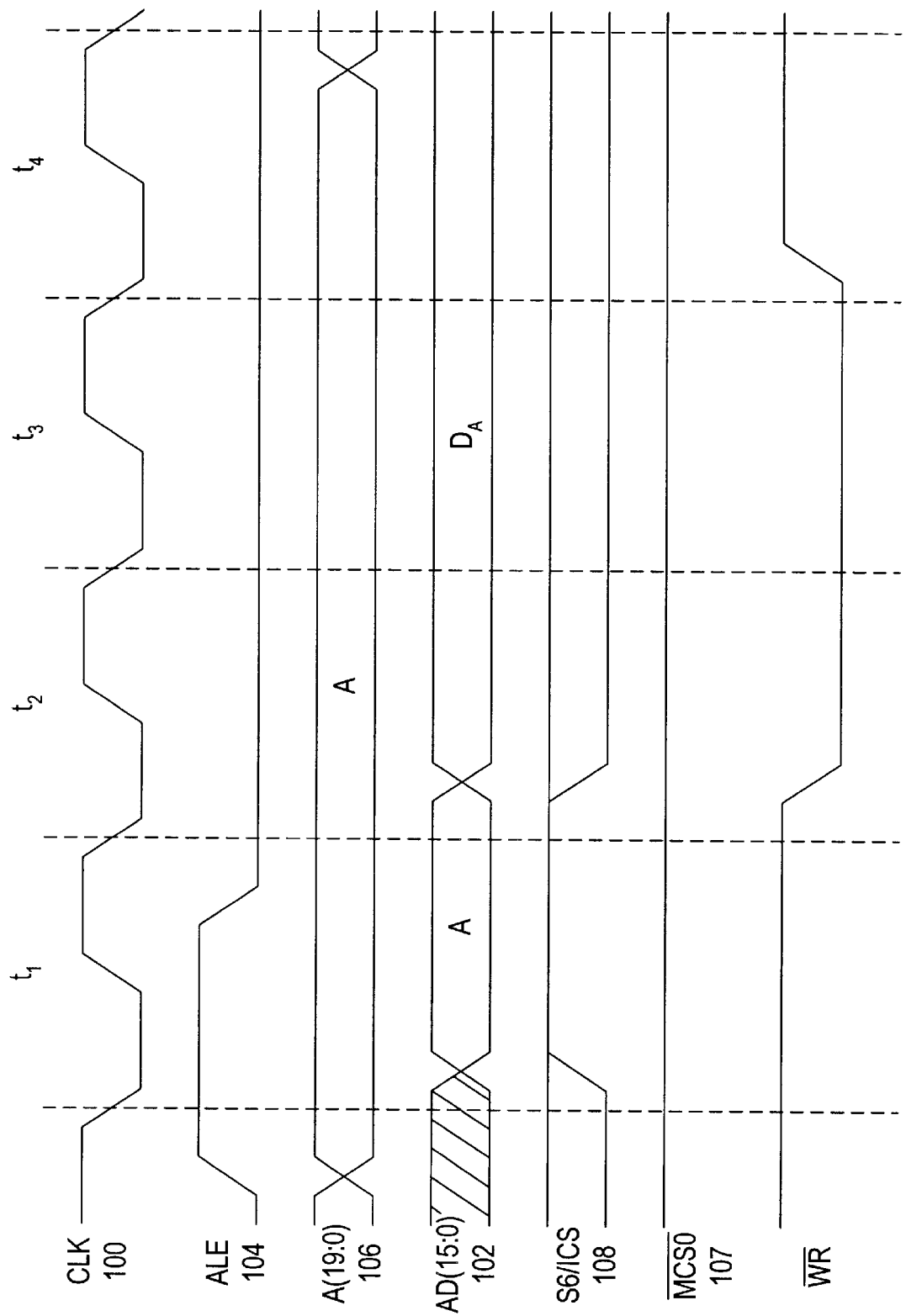
FIG. 9 is a timing diagram depicting a write access by the microcontroller shown in FIG. 1 to an overlaid external memory using the internal chip select signal.

Turning now to FIG. 9, a timing diagram depicting a write access by the microcontroller 10 shown in FIG. 1 to an overlaid external memory, such as external memory 44 of FIG. 2, using the internal chip select signal 72 provided externally on the S6/ICS pin 94 is shown. The timing diagram of FIG. 9 is similar to that of FIG. 5, and the access to the overlaid external memory is similar to the access depicted in FIG. 5, with the difference that the internal chip select signal 72 is asserted on the S6/ICS pin 94 during the $t_1$ bus cycle, as shown, and this signal is used to select the external memory 44 rather than the external chip select, i.e. MCS0 107 as in FIG. 5. In one embodiment, logic within the ICE 42 latches the signal provided on the S6/ICS pin 94 during the $t_1$ bus cycle and provides the latched signal to the external memory 44 to select the external memory as the target of the write access. The microcontroller 10 then provides the data "$D_A$" corresponding to address A to the external memory 44 beginning with the $t_2$ bus cycle as shown.

Although the 80C186 interface and architecture has been used as an exemplary embodiment herein, the present invention is not limited to these embodiments. Any microcontroller which integrates memory may benefit from the present invention. Furthermore, any integrated circuit which integrates memory and devices which access that memory may benefit from the present invention.

In accordance with the above disclosure, a microcontroller is described which includes a debug mode feature. The debug feature aids in diagnosing code problems when all or a portion of the memory is integrated into the microcontroller. The feature causes the value of an internal chip select indicating that the internal memory is the target of the transfer to be broadcast on the external bus of the microcontroller although the internal memory is disabled. Advantageously, accesses to the internal memory may be overlaid by an external memory, such as may reside in an ICE for example, thereby facilitating code debugging.

It will be appreciated by those skilled in the art having the benefit of this disclosure that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A microcontroller, comprising:
   a chip select unit configured to decode an address forwarded to the chip select unit and generate a chip select signal forwarded internal to and external from the microcontroller;
   an internal memory responsive to the chip select signal forwarded internal to the microcontroller, wherein the internal memory and the chip select unit are arranged upon a monolithic substrate which embodies said microcontroller; and
   a pin extending from the microcontroller which, when coupled to a pre-defined logic value, deactivates the chip select signal forwarded internal to the microcontroller while retaining the chip select signal forwarded external from the microcontroller.

2. The microcontroller as recited in claim 1, wherein the chip select signal is deactivated during a reset of said microcontroller.

3. The microcontroller as recited in claim 1, wherein the pin samples the pre-defined logic value during a predetermined time period.

4. The microcontroller as recited in claim 3, wherein the predetermined time period occurs during deassertion of a reset signal forwarded to said microcontroller.

5. The microcontroller as recited in claim 1, further comprising another pin extending from the microcontroller for carrying the chip select signal external to said microcontroller.

6. The microcontroller as recited in claim 1, further configured to provide a memory address on an address bus extending from said microcontroller concurrent with said chip select signal forwarded external from the microcontroller.

7. The microcontroller as recited in claim 6, further comprising a programmable configuration register arranged upon the monolithic substrate for specifying an address range of said memory address corresponding to said internal memory.

8. The microcontroller as recited in claim 1, further comprising:
   an address bus coupled to the internal memory for accessing the internal memory during times when the chip select signal forwarded internal to the microcontroller is active; and
   an external memory coupled to the address bus for accessing the external memory during times when the chip select signal forwarded external from the microcontroller is either active or inactive.

9. The microcontroller as recited in claim 8, wherein the external memory and the internal memory are accessed within the same memory address space.

10. A computer system, comprising
   an external memory arranged on a monolithic substrate separate from an integrated circuit, wherein said integrated circuit comprises:

a core configured to generate a memory address within a memory address space;

an internal memory coupled to said core for storing data for use by said core, wherein said internal memory and said external memory reside within a common address range of said address space;

chip select logic coupled to said core and said internal memory for asserting a chip select signal to said internal memory and said external memory in response to said memory address if said memory address is within said common address range; and a pin coupled to the chip select logic and extending from the integrated circuit, wherein the pin is adapted for connection to a signal forwarded to the integrated circuit and, responsive to said signal, for inhibiting the chip select signal to only said internal memory.

11. The computer system as recited in claim 10, wherein said pin is configured to sample the signal during a predetermined time period and inhibit said chip select signal to said internal memory if said sampled signal is a predetermined signal value.

12. The computer system as recited in claim 10, wherein said integrated circuit further comprises another pin coupled to said logic and extending from the integrated circuit for providing said chip select signal to the external memory.

13. The computer system as recited in claim 10, wherein said integrated circuit is further configured to provide said memory address on an address bus to said external memory concurrent with said chip select signal.

14. The computer system as recited in claim 10, wherein said integrated circuit further comprises a programmable configuration register for specifying said address range of said internal memory.

15. The system as recited in claim 10, wherein said external memory is embodied within an in-circuit-emulator.

16. A method for operating an integrated circuit, comprising:

generating a memory address within a memory address space;

determining if said memory address is within an address range of said address space in which an internal memory resides;

asserting a chip select signal if said memory address is within said address range;

determining if said integrated circuit is configured in a mode; and inhibiting said chip select signal to the internal memory and providing said chip select signal external to said integrated circuit if said integrated circuit is configured in said mode.

17. The method as recited in claim 16, further comprising sampling a signal on a pin of said integrated circuit during a predetermined time period and placing said integrated circuit in said mode prior to said generating said memory address if said sampled signal is a predetermined signal value.

18. The method as recited in claim 17, wherein said predetermined time period is during deassertion of a reset signal received by said integrated circuit.

19. The method as recited in claim 16, further comprising determining if said integrated circuit is configured in a second mode prior to said generating said memory address and providing said chip select signal to said internal memory if said integrated circuit is configured in said second mode.

20. The method as recited in claim 16, further comprising providing said memory address on an address bus external to said integrated circuit concurrent with said providing said chip select signal.

21. The method as recited in claim 16, further comprising programming a configuration register to specify said address range of said internal memory.

* * * * *